(12) United States Patent
Qiu

(10) Patent No.: US 7,897,678 B2
(45) Date of Patent: *Mar. 1, 2011

(54) FLUOROCHEMICAL URETHANE COMPOUNDS HAVING PENDENT SILYL GROUPS

(75) Inventor: Zai-Ming Qiu, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 753 days.

This patent is subject to a terminal disclaimer.

(21) Appl. No.: 11/828,642

(22) Filed: Jul. 26, 2007

(65) Prior Publication Data

US 2009/0025608 A1    Jan. 29, 2009

(51) Int. Cl.
| | |
|---|---|
| C08F 8/30 | (2006.01) |
| C08F 283/04 | (2006.01) |
| C08G 18/00 | (2006.01) |
| C08G 18/08 | (2006.01) |
| C08G 18/10 | (2006.01) |
| C08G 18/28 | (2006.01) |
| C08G 18/70 | (2006.01) |
| C08G 77/04 | (2006.01) |
| C08J 3/00 | (2006.01) |
| C08K 3/20 | (2006.01) |
| C08L 75/00 | (2006.01) |
| C08L 83/00 | (2006.01) |
| C08L 83/04 | (2006.01) |

(52) U.S. Cl. ............ 524/507; 524/588; 524/589; 524/590; 525/123; 525/455; 528/28; 528/44; 528/61; 528/65; 528/66; 528/70; 528/80; 528/84; 528/85

(58) Field of Classification Search ......... 524/507, 524/588, 589, 590, 590 PN; 525/123, 455; 528/28, 44, 61, 65, 66, 70, 80, 84, 85
See application file for complete search history.

(56) References Cited

U.S. PATENT DOCUMENTS

| | | | |
|---|---|---|---|
| 3,250,808 A | 5/1966 | Moore et al. | |
| 3,868,727 A | 3/1975 | Paschall | |
| 3,986,997 A | 10/1976 | Clark | |
| 4,188,451 A | 2/1980 | Humphrey, Jr. | |
| 4,262,072 A | 4/1981 | Wendling et al. | |
| 4,378,250 A | 3/1983 | Treadway et al. | |
| 4,508,916 A | 4/1985 | Newell et al. | |
| 4,624,870 A | 11/1986 | Anthony | |
| 4,707,860 A | 11/1987 | Holmström | |
| 4,863,244 A | 9/1989 | Fuerthbauer et al. | |
| 4,944,962 A | 7/1990 | Furuta et al. | |
| 5,041,313 A | 8/1991 | Patel | |
| H1023 H | 3/1992 | Wiseman, Sr. | |
| 5,191,468 A | 3/1993 | Mases | |
| 5,274,159 A | 12/1993 | Pellerite et al. | |
| 5,303,423 A | 4/1994 | Gazzara et al. | |
| 5,303,701 A | 4/1994 | Heins et al. | |
| 5,411,807 A | 5/1995 | Patel et al. | |
| 5,446,925 A | 9/1995 | Baker et al. | |
| 5,642,530 A | 7/1997 | Parks | |
| 5,825,441 A | 10/1998 | Hörnell et al. | |
| 5,924,420 A | 7/1999 | Reischel et al. | |
| D416,649 S | 11/1999 | Burns et al. | |
| 6,055,666 A | 5/2000 | Eklund et al. | |
| 6,277,178 B1 | 8/2001 | Holmquist-Brown et al. | |
| 6,361,870 B1 | 3/2002 | Steffl et al. | |
| 6,518,357 B1 | 2/2003 | Rajagopalan et al. | |
| 6,664,354 B2 | 12/2003 | Savu et al. | |
| 6,763,835 B1 | 7/2004 | Grove et al. | |
| 6,838,142 B2 | 1/2005 | Yang et al. | |
| 6,895,960 B2 | 5/2005 | Fabin | |
| 6,978,782 B2 | 12/2005 | Tayebi | |
| 7,094,829 B2 | 8/2006 | Audenaert et al. | |
| 7,097,910 B2 | 8/2006 | Moore et al. | |
| 7,147,671 B2 | 12/2006 | Butts et al. | |
| 7,166,329 B2 | 1/2007 | Dams | |
| 7,173,778 B2 | 2/2007 | Jing et al. | |
| 7,200,875 B2 | 4/2007 | Dondero | |
| 7,335,786 B1 | 2/2008 | Iyer et al. | |
| 7,652,116 B2 * | 1/2010 | Clark et al. ............ 528/28 |
| 2002/0109922 A1 | 8/2002 | Wilson et al. | |
| 2004/0077775 A1 | 4/2004 | Audenaert et al. | |
| 2004/0092675 A1 | 5/2004 | Moore et al. | |
| 2004/0147188 A1 | 7/2004 | Johnson et al. | |
| 2005/0002108 A1 | 1/2005 | Wilson et al. | |
| 2005/0054804 A1 | 3/2005 | Dams et al. | |

(Continued)

FOREIGN PATENT DOCUMENTS

DE    100 04 132 A1    8/2001

(Continued)

OTHER PUBLICATIONS

PCT International Search Report, PCT/US2008/070977, filed Jul. 24, 2008.

(Continued)

Primary Examiner—Patrick D Niland
(74) Attorney, Agent, or Firm—Kent S. Kokko

(57) ABSTRACT

Fluorochemical urethane compounds and coating compositions derived therefrom are described. The compounds and compositions may be used in treating substrates, in particular substrates having a hard surface such as plastics, ceramics or glass, to render them water, oil, stain, and soil repellent.

16 Claims, No Drawings

U.S. PATENT DOCUMENTS

| | | |
|---|---|---|
| 2005/0121644 A1 | 6/2005 | Dams et al. |
| 2005/0143541 A1* | 6/2005 | Caldwell et al. ............ 526/242 |
| 2005/0164010 A1 | 7/2005 | Trombetta |
| 2006/0021729 A1 | 2/2006 | Werner et al. |
| 2006/0142519 A1* | 6/2006 | Qiu et al. .................... 526/319 |
| 2007/0054133 A1 | 3/2007 | Sherman et al. |
| 2007/0055019 A1 | 3/2007 | Sherman et al. |
| 2008/0027203 A1 | 1/2008 | Dams |

FOREIGN PATENT DOCUMENTS

| | | |
|---|---|---|
| EP | 1 410 775 A2 | 4/2004 |
| JP | 7-117065 | 5/1995 |
| JP | 7-316506 | 12/1995 |
| JP | 8-318598 | 12/1996 |
| JP | 2005-99381 | 4/2005 |
| JP | 2005-331607 | 12/2005 |
| WO | WO 98/33079 A1 | 7/1998 |
| WO | WO 98/51724 | 11/1998 |
| WO | WO 01/17770 A1 | 3/2001 |
| WO | WO 2005/030891 | 4/2005 |
| WO | WO 2006/071567 | 7/2006 |
| WO | WO 2006/102383 | 9/2006 |

OTHER PUBLICATIONS

AEARO Corporation, http://www.aosafety.com/industrial/face_detail.cfm?prod_family=TuffMaster&ind_prod_num=82790-00000001, Mar. 20, 2007.

Scott Health & Safety, http://www.scotthealthsafety.com/lenscovers.htm, Nov. 19, 2003.

Momentive Performance Materials, http://www.gesilicones.com/siliconesweb/am1/en/documents/datasheets/303.html?SMSESSION=NO, printed on Apr. 20, 2007.

U.S. Appl. No. 60/871,034, filed Dec. 20, 2006 entitled "Fluorochemical Urethane Compounds Having Pendent Silyl Groups".

U.S. Appl. No. 11/828,566, filed Jul. 26, 2007 entitled "Respirator, Welding Helmet, or Face Shield that has Low Surface Energy Hard-coat Lens".

U.S. Appl. No. 60/870,300, filed Dec. 15, 2006 entitled "Fluorochemical Urethane Compounds having Pendent Silyl Groups".

U.S. Appl. No. 11/683,823, filed Mar. 8, 2007 entitled "Fluorochemical Compounds Having Pendent Silyl Groups".

* cited by examiner

FLUOROCHEMICAL URETHANE COMPOUNDS HAVING PENDENT SILYL GROUPS

FIELD OF THE INVENTION

The present disclosure relates to fluorochemical urethane compounds and coating compositions derived therefrom, which may be used in treating substrates, in particular substrates having a hard surface such as plastics, ceramics or glass, to render them abrasive resistant and durable water, oil, stain, and soil repellent for easy cleaning.

BACKGROUND

Although many fluorinated compositions are known in the art for treating substrates to render them oil and water repellent, there continues to be a desire to provide further improved compositions for the treatment of substrates, in particular substrates having a hard surface such as plastics, ceramics, glass and stone, in order to render them water-repellent, oil-repellent, and easy to clean. There is also a need for treating glass and plastic as a hard surface, particularly in the optical field, in order to render them durably abrasive-, chemical- and solvent-resistant and stain-, dirt- and dust-resistant.

Desirably, such compositions and methods employing them can yield coatings that have improved properties. In particular, it would be desirable to improve the durability of the coating, including an improved abrasion resistance of the coating. Furthermore, improving the ease of cleaning of such substrates while using less detergents, water or manual labor, is not only a desire by the end consumer, but has also a positive impact on the environment. Also, it is desired that the coatings show particularly good chemical and solvent resistance. The compositions should be conveniently applied in an easy and safe way and are compatible with existing manufacturing methods. Preferably, the compositions will fit easily into the manufacturing processes that are practiced to produce the substrates to be treated.

SUMMARY

The present disclosure provides fluorochemical urethane compounds comprising the reaction product of:
a) a polyisocyanate,
b) an isocyanate-reactive perfluoropolyether compound,
c) an oligomer of the formula:

X-[M$^1$]$_a$-[M$^2$]$_b$-S—R—X$^3$H, wherein

X is H, or the residue of an initiator,
M$^1$ is the residue of a (meth)acrylate monomer having a pendent silyl group,
M$^2$ is the residue of (meth)acrylate ester monomer,
R$^3$ is a divalent alkylene or arylene group, or combinations thereof, said alkylene groups optionally containing one or more catenary oxygen atoms; and
X$^3$ is —O—, —S—, or —NR$^4$—, where R$^4$ is H or C$_1$-C$_4$ alkyl;
a is at least 2, b may be 0 and a+b is 2-20, preferably a is at least 3; and
d) optionally an isocyanate-reactive silane compound.

The fluorochemical urethane compounds can provide durable, abrasion resistant coatings for a number of substrates. The number of silane functional groups can be varied as a function of the oligomer component and/or the optional an isocyanate-reactive silane compound for better control of the compatibility (e.g. with solvents and/or substrates), and/or the coating quality resulting in low surface energy and cleanability performance. Further, the ratio of the hydrocarbon segment to fluorochemical segments may be varied by controlling the molecular weight of the oligomer and/or incorporating (meth)acrylate ester groups into the oligomer Unless otherwise stated, the following terms used in the specification and claims have the meanings given below:

"Alkyl" means a linear or branched, cyclic or acyclic, saturated monovalent hydrocarbon radical having from one to about twelve carbon atoms, e.g., methyl, ethyl, 1-propyl, 2-propyl, pentyl, and the like.

"Acryloyl" means an acrylate, thioacrylate or acrylamide.

"Alkylene" means a linear saturated divalent hydrocarbon radical having from one to about twelve carbon atoms or a branched saturated divalent hydrocarbon radical having from three to about twelve carbon atoms, e.g., methylene, ethylene, propylene, 2-methylpropylene, pentylene, hexylene, and the like.

"Alkoxy" means an alkyl having a terminal oxygen atom, e.g. CH$_3$—O—, C$_2$H$_5$—O—, and the like.

"Aralkylene" means an alkylene radical defined above with an aromatic group attached to the alkylene radical, e.g., benzyl, 1-naphthylethyl, and the like.

"Cured chemical composition" means that the chemical composition is dried or solvent has evaporated from the chemical composition from ambient temperature or higher until dryness. The composition may further be crosslinked as result of siloxane bonds formed between the urethane compounds.

"Nucleophilic perfluoropolyether compound" means a compound having one or two nucleophilic, isocyanate-reactive functional groups, such as a hydroxyl group or an amine group, and a perfluorooxyalkyl or perfluorooxyalkylene group, e.g. C$_2$F$_5$O(C$_2$F$_4$O)$_3$CF$_2$CONHC$_2$H$_4$OH, and the like.

"Fluorochemical urethane compounds" refers to compounds of Formula I, and will include those having urethane linkages per se, or alternatively urea and/or thiourea linkages.

"Hard substrate" means any rigid material that maintains its shape, e.g., glass, ceramic, concrete, natural stone, wood, metals, plastics, and the like.

"Hard-coat layer" means a layer or coating that is located on the external surface of an object, which layer or coating has been designed to at least protect the object from abrasion;

"(meth)acrylate" refers to both methacrylate and acrylate.

"Oligomer" means a polymer molecule consisting of only a few, i.e. up to an average of 20, but preferably up to an average of 10, repeating (polymerized) or repeatable units.

"Oxyalkoxy" has essentially the meaning given above for alkoxy except that one or more oxygen atoms may be present in the alkyl chain and the total number of carbon atoms present may be up to 50, e.g. CH$_3$CH$_2$OCH$_2$CH$_2$O—, C$_4$H$_9$OCH$_2$CH$_2$OCH$_2$CH$_2$O—, CH$_3$O(CH$_2$CH$_2$O)$_{1-100}$H, and the like.

"Oxyalkyl" has essentially the meaning given above for alkyl except that one or more oxygen heteroatoms may be present in the alkyl chain, these heteroatoms being separated from each other by at least one carbon, e.g., CH$_3$CH$_2$OCH$_2$CH$_2$—, CH$_3$CH$_2$OCH$_2$CH$_2$OCH(CH$_3$)CH$_2$—, C$_4$F$_9$CH$_2$OCH$_2$CH$_2$—, and the like.

"Oxyalkylene" has essentially the meaning given above for alkylene except that one or more oxygen heteroatoms may be present in the alkylene chain, these heteroatoms being separated from each other by at least one carbon, e.g., —CH$_2$OCH$_2$O—, —CH$_2$CH$_2$OCH$_2$CH$_2$—, —CH$_2$CH$_2$OCH$_2$CH$_2$CH$_2$—, and the like.

"Halo" means fluoro, chloro, bromo, or iodo, preferably fluoro and chloro.

"Perfluoroalkyl" has essentially the meaning given above for "alkyl" except that all or essentially all of the hydrogen atoms of the alkyl radical are replaced by fluorine atoms and the number of carbon atoms is from 1 to about 12, e.g. perfluoropropyl, perfluorobutyl, perfluorooctyl, and the like.

"Perfluoroalkylene" has essentially the meaning given above for "alkylene" except that all or essentially all of the hydrogen atoms of the alkylene radical are replaced by fluorine atoms, e.g., perfluoropropylene, perfluorobutylene, perfluorooctylene, and the like "Perfluorooxyalkyl" has essentially the meaning given above for "oxyalkyl" except that all or essentially all of the hydrogen atoms of the oxyalkyl radical are replaced by fluorine atoms and the number of carbon atoms is from 3 to about 100, e.g. $CF_3CF_2OCF_2CF_2-$, $CF_3CF_2O(CF_2CF_2O)_3CF_2CF_2-$, $C_3F_7O(CF(CF_3)CF_2O)_sCF(CF_3)CF_2-$, where s is (for example) from about 1 to about 50, and the like.

"Perfluorooxyalkylene" has essentially the meaning given above for "oxyalkylene" except that all or essentially all of the hydrogen atoms of the oxyalkylene radical are replaced by fluorine atoms, and the number of carbon atoms is from 3 to about 100, e.g., $-CF_2OCF_2-$, or $-[CF_2-CF_2-O]_r-[CF(CF_3)-CF_2-O]_s-$; wherein r and s are (for example) integers of 1 to 50.

"Perfluorinated group" means an organic group wherein all or essentially all of the carbon bonded hydrogen atoms are replaced with fluorine atoms, e.g. perfluoroalkyl, perfluorooxyalkyl, and the like.

"Polyfunctional isocyanate compound" or "polyisocyanate" means a compound containing an average of greater than one, preferably two or more isocyanate groups, —NCO, attached to a multivalent organic group, e.g. hexamethylene diisocyanate, the biuret and isocyanurate of hexamethylene diisocyanate, and the like.

"Residue" means that part of the original organic molecule remaining after reaction. For example, the residue of hexamethylene diisocyanate is $-C_6H_{12}-$.

It is to be understood that the recitation of numerical ranges by endpoints includes all numbers and fractions subsumed within that range (e.g. 1 to 3 includes 1, 1.5, 2, 2.75, and 3, as mixture of compounds result.

DETAILED DESCRIPTION

The present invention provides fluorochemical urethane compounds comprising the reaction product of a polyisocyanate, an isocyanate-reactive perfluoropolyether compound; an isocyanate-reactive oligomer derived from ethylenically unsaturated monomer units having pendent silyl groups preferably a (meth)acrylate oligomer; and optionally a nucleophilic, isocyanate-reactive silane compound.

In some embodiments the disclosure provides fluorochemical urethane compounds of the formula:

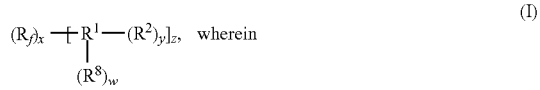

(I) wherein $R_f$ is a monovalent perfluorooxyalkyl-containing group or a divalent perfluorooxyalkylene-containing group,
$R^1$ is the residue of a polyisocyanate,
$R^2$ is a silane-containing (meth)acrylate oligomer,
$R^8$ is the residue of a an isocyanate-reactive silane compound,
w is 0, 1 or 2, x and y are each independently at least 1, and z is 1 or 2.

The disclosure also provides a coating composition of the fluorochemical urethane compounds of Formula I and a solvent. For certain hardcoat applications, where the coating must be more durable and abrasion resistant, the coating composition may further comprise silicone hardcoats, such as silica containing silsesquioxanes.

In one embodiment, the disclosure provides a coating composition comprising the compound of Formula I, a solvent, and optionally water and an acid. In another embodiment, the coating composition comprises an aqueous suspension or dispersion of the compounds. To achieve good durability for many substrates, such as ceramics, the compositions of the present disclosure preferably include water. Thus the present disclosure provides a method of coating comprising the steps of providing contacting a substrate with a coating composition comprising the compound of Formula I and a solvent. The coating composition may further comprise water and an acid. In one embodiment the method comprises contacting a substrate with a coating composition comprising the silane of Formula I and a solvent, and subsequently contacting the substrate with an aqueous acid.

Polyisocyanate compounds useful in preparing the fluorochemical compounds of the present disclosure comprise isocyanate radicals attached to the multivalent organic group ($R^1$, the "residue" of a polyisocyanate)) that can comprise a multivalent aliphatic, alicyclic, or aromatic moiety; or a multivalent aliphatic, alicyclic or aromatic moiety attached to a biuret, an isocyanurate, or a uretdione, or mixtures thereof. Preferred polyfunctional isocyanate compounds contain an average of at least two isocyanate (—NCO) radicals. Compounds containing at least two —NCO radicals are preferably comprised of di- or trivalent aliphatic, alicyclic, aralphatic, or aromatic groups to which the —NCO radicals are attached. Aliphatic di- or trivalent groups are preferred.

Representative examples of suitable polyisocyanate compounds include isocyanate functional derivatives of the polyisocyanate compounds as defined herein. Examples of derivatives include, but are not limited to, those selected from the group consisting of ureas, biurets, allophanates, dimers and trimers (such as uretdiones and isocyanurates) of isocyanate compounds, and mixtures thereof. Any suitable organic polyisocyanate, such as an aliphatic, alicyclic, aralphatic, or aromatic polyisocyanate, may be used either singly or in mixtures of two or more.

The aliphatic polyisocyanate compounds generally provide better light stability than the aromatic compounds. Aromatic polyisocyanate compounds, on the other hand, are generally more economical and reactive toward nucleophiles than are aliphatic polyisocyanate compounds. Suitable aromatic polyisocyanate compounds include, but are not limited to, those selected from the group consisting of 2,4-toluene diisocyanate (TDI), 2,6-toluene diisocyanate, an adduct of TDI with trimethylolpropane (available as Desmodur™ CB from Bayer Corporation, Pittsburgh, Pa.), the isocyanurate trimer of TDI (available as Desmodur™ IL from Bayer Corporation, Pittsburgh, Pa.), diphenylmethane 4,4'-diisocyanate (MDI), diphenylmethane 2,4'-diisocyanate, 1,5-diisocyanato-naphthalene, 1,4-phenylene diisocyanate, 1,3-phenylene diisocyanate, 1-methyoxy-2,4-phenylene diisocyanate, 1-chlorophenyl-2,4-diisocyanate, and mixtures thereof.

Examples of useful alicyclic polyisocyanate compounds include, but are not limited to, those selected from the group consisting of dicyclohexylmethane diisocyanate ($H_{12}$ MDI, commercially available as Desmodur™ available from Bayer Corporation, Pittsburgh, Pa.), 4,4'-isopropyl-bis(cyclohexylisocyanate), isophorone diisocyanate (IPDI), cyclobutane-1,3-diisocyanate, cyclohexane 1,3-diisocyanate, cyclohexane 1,4-diisocyanate (CHDI), 1,4-cyclohexanebis(methylene isocyanate) (BDI), dimmer acid diisocyanate (available from Bayer), 1,3-bis(isocyanatomethyl)cyclohexane ($H_6$ XDI), 3-isocyanatomethyl-3,5,5-trimethylcyclohexyl isocyanate, and mixtures thereof.

Examples of useful aliphatic polyisocyanate compounds include, but are not limited to, those selected from the group consisting of tetramethylene 1,4-diisocyanate, hexamethylene 1,4-diisocyanate, hexamethylene 1,6-diisocyanate (HDI), octamethylene 1,8-diisocyanate, 1,12-diisocyanatododecane, 2,2,4-trimethyl-hexamethylene diisocyanate (TMDI), 2-methyl-1,5-pentamethylene diisocyanate, dimer diisocyanate, the urea of hexamethylene diisocyanate, the biuret of hexamethylene 1,6-diisocyanate (HDI) (Desmodur™ N-100 and N-3200 from Bayer Corporation, Pittsburgh, Pa.), the isocyanurate of HDI (available as Desmodur™ N-3300 and Desmodur™ N-3600 from Bayer Corporation, Pittsburgh, Pa.), a blend of the isocyanurate of HDI and the uretdione of HDI (available as Desmodure™ N-3400 available from Bayer Corporation, Pittsburgh, Pa.), and mixtures thereof.

Examples of useful araliphatic polyisocyanates include, but are not limited to, those selected from the group consisting of m-tetramethyl xylylene diisocyanate (m-TMXDI), p-tetramethyl xylylene diisocyanate (p-TMXDI), 1,4-xylylene diisocyanate (XDI), 1,3-xylylene diisocyanate, p-(1-isocyanatoethyl)phenyl isocyanate, m-(3-isocyanatobutyl)phenyl isocyanate, 4-(2-isocyanatocyclohexyl-methyl)phenyl isocyanate, and mixtures thereof.

Preferred polyisocyanates, in general, include those selected from the group consisting of tetramethylene 1,4-diisocyanate, hexamethylene 1,4-diisocyanate, hexamethylene 1,6-diisocyanate (HDI), octamethylene 1,8-diisocyanate, 1,12-diisocyanatododecane, and the like, and mixtures thereof. Fluorochemical compositions of the present disclosure comprising compounds or oligomers made with preferred polyisocyanates impart both high water and hexadecane receding dynamic contact angles. High water receding dynamic contact angle together with high hexadecane receding dynamic contact angle is typically predictive of good water-repellency and oil-repellency properties.

The fluorochemical urethane comprises, in part, the reaction product of a nucleophilic perfluoropolyether compound having a mono- or difunctional perfluorinated group, and at least one nucleophilic, isocyanate-reactive functional group. Such compounds include those of the formula:

where $R_f^1$ is a monovalent perfluorooxyalkyl group (where z is 1), or a divalent perfluorooxyalkylene group (where z is 2), Q is a covalent bond, or a polyvalent alkylene group of valency y+1, said alkylene optionally containing one or more catenary (in-chain) nitrogen or oxygen atoms, and optionally containing one or more sulfonamide, carboxamido, or carboxy functional groups;

$X^2H$ is an isocyanate-reactive group, wherein $X^2$ is selected from —O—, —$NR^4$—, or —S—, where $R^4$ is H or $C_1$-$C_4$ alkyl, y is 1 or 2, and z is 1 or 2.

With respect to Formulas I and II, the reaction between the nucleophilic fluorochemical compound (II) and an isocyanate group of a polyisocyanate produces a urea- or urethane-linked fluorine-containing group. Thus $R_f$ of Formula I is of the Formula III.

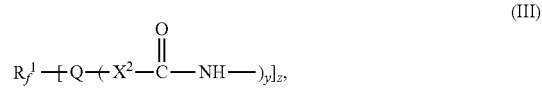

where $R_f^1$ is a monovalent perfluoroalkyl or a perfluorooxyalkyl group (where z is 1), or a divalent perfluoroalkylene or a perfluorooxyalkylene group (where z is 2), Q is a covalent bond, or a polyvalent alkylene group of valency y+1, said alkylene optionally containing one or more catenary (in-chain) nitrogen or oxygen atoms, and optionally containing one or more sulfonamide, carboxamido, or carboxy functional groups;

$X^2$ is —O—, —$NR^4$—, or —S—, where $R^4$ is H or $C_1$-$C_4$ alkyl, y is 1 or 2, and z is 1 or 2.

The $R_f^1$ groups of Formula I to III can contain straight chain, or branched chain or perfluorooxyalkylene or perfluorooxyalkyl groups or any combination thereof. The $R_f^1$ groups can be mono- or divalent and fully-fluorinated groups are generally preferred, but hydrogen or other halo atoms can also be present as substituents, provided that no more than one atom of either is present for every two carbon atoms.

It is additionally preferred that any $R_f^1$ group contain at least about 40% fluorine by weight, more preferably at least about 50% fluorine by weight. The terminal portion of the monovalent $R_f^1$ group is generally fully-fluorinated, preferably containing at least three fluorine atoms, e.g., $CF_3$—, $CF_3CF_2$—, $CF_3CF_2CF_2$—, $(CF_3)_2N$—, $(CF_3)_2CF$—, $SF_5CF_2$—.

Useful perfluorooxyalkyl and perfluorooxyalkylene $R_f^1$ groups correspond to the formula:

wherein

W is F for monovalent perfluorooxyalkyl, and an open valence ("—") for divalent perfluorooxyalkylene $R_f^3$ represents a perfluoroalkylene group, $R_f^4$ represents a perfluoroalkyleneoxy group consisting of perfluoroalkyleneoxy groups having 1, 2, 3 or 4 carbon atoms or a mixture of such perfluoroalkyleneoxy groups, $R_f^5$ represents a perfluoroalkylene group and q is 0 or 1. The perfluoroalkylene groups $R_f^3$ and $R_f^5$ in formula (IV) may be linear or branched and may comprise 1 to 10 carbon atoms, preferably 1 to 6 carbon atoms. A typical monovalent perfluoroalkyl group is $CF_3$—$CF_2$—$CF_2$— and a typical divalent perfluoroalkylene is —$CF_2$—$CF_2$—$CF_2$—, —$CF_2$— or —$CF(CF_3)CF_2$—. Examples of perfluoroalkyleneoxy groups $R_f^4$ include: —$CF_2$—$CF_2$—O—, —$CF(CF_3)$—$CF_2$—O—, —$CF_2$—$CF(CF_3)$—O—, —$CF_2$—$CF_2$—$CF_2$—O—, —$CF_2$—O—, —$CF(CF_3)$—O—, and —$CF_2$—$CF_2$—$CF_2$—$CF_2$—O—.

The perfluoroalkyleneoxy group $R_f^4$ may be comprised of the same perfluorooxyalkylene units or of a mixture of different perfluorooxyalkylene units. When the perfluorooxyalkylene group is composed of different perfluoroalkylene oxy units, they can be present in a random configuration, alternating configuration or they can be present as blocks. Typical examples of perfluorinated poly(oxyalkylene) groups include: —[$CF_2$—$CF_2$—O]$_r$—; —[$CF(CF_3)$—$CF_2$—O]$_s$—; —[$CF_2CF_2$—O]$_r$—[$CF_2O$]$_t$—, —[$CF_2CF_2CF_2$—O)]$_u$ and —[$CF_2$—$CF_2$—O]$_r$—[$CF(CF_3)$—$CF_2$—O]$_s$—; wherein each of r, s, t and u each are integers of 1 to 50, preferably 2 to 25. A preferred perfluorooxyalkyl group that corresponds to formula (IV) is $CF_3$—$CF_2$—$CF_2$—O—[$CF(CF_3)$—$CF_2O$]$_s$—$CF(CF_3)CF_2$— wherein s is an integer of 2 to 25.

Perfluorooxyalkyl and perfluoroxyalkylene compounds can be obtained by oligomerization of hexafluoropropylene oxide that results in a terminal carbonyl fluoride group. This carbonyl fluoride may be converted into an acid, ester or alcohol by reactions well known to those skilled in the art. The carbonyl fluoride or acid, ester or alcohol derived therefrom may then be reacted further to introduce the desired isocyanate reactive groups according to known procedures.

With respect to Formula I to III, where y or z is 1, fluorochemical monofunctional compounds, preferably monoalcohols and monoamines are contemplated. Representative examples of useful fluorochemical monofunctional compounds include the following: $C_4F_9OC_2F_4OCF_2CH_2OCH_2CH_2OH$; $C_3F_7O(CF(CF_3)CF_2O)_{1-36}CF(CF_3)C(O)N(H)CH_2CH_2OH$ and the like, and mixtures thereof. If desired, other isocyanate-reactive functional groups may be used in place of those depicted.

With respect to Formula I to II, where y or z is 2, fluorinated polyols are preferred. Representative examples of suitable fluorinated polyols include $R_f^1SO_2N(CH_2CH_2OH)_2$, $R_f^1OC_6H_4SO_2N(CH_2CH_2OH)_2$; $R_f^1SO_2N(R')CH_2CH(OH)CH_2OH$;

$R_f^1CH_2CON(CH_2CH_2OH)_2$; $CF_3CF_2(OCF_2CF_2)_3OCF_2CON(CH_3)CH_2CH(OH)CH_2OH$;

$R_f^1OCH_2CH(OH)CH_2OH$; $R_f^1CH_2CH_2SC_3H_6OCH_2CH(OH)CH_2OH$;

$R_f^1CH_2CH_2SC_3H_6CH(CH_2OH)_2$; $R_f^1CH_2CH_2SCH_2CH(OH)CH_2OH$;

$R_f^1{}^{CH}_2CH_2SCH(CH_2OH)CH_2CH_2OH$; $R_f^1CH_2CH_2CH_2SCH_2CH(OH)CH_2OH$;

$R_f^1CH_2CH_2CH_2OCH_2CH(OH)CH_2OH$; $R_f^1CH_2CH_2CH_2OC_2H_4OCH_2CH(OH)CH_2OH$;

$R_f^1CH_2CH_2(CH_3)OCH_2CH(OH)CH_2OH$; $R_f^1(CH_2)_4SC_3H_6CH(CH_2OH)CH_2OH$;

$R_f^1(CH_2)_4SCH_2CH(CH_2OH)_2$; $R_f^1(CH_2)_4SC_3H_6OCH_2CH(OH)CH_2OH$;

$R_f^1CH_2CH(C_4H_9)SCH_2CH(OH)CH_2OH$; $R_f^1CH_2OCH_2CH(OH)CH_2OH$;

$R_f^1CH_2CH(OH)CH_2SCH_2CH_2OH$; $R_f^1CH_2CH(OH)CH_2SCH_2CH_2OH$;

$R_f^1CH_2CH(OH)CH_2OCH_2CH_2OH$; $R_f^1CH_2CH(OH)CH_2OH$; $R_f^1R"SCH(R"'OH)CH(R"'OH)SR"R_f^1$; $(R_f^1CH_2CH_2SCH_2CH_2SCH_2)_2C(CH_2OH)_2$;

$((CF_3)_2CFO(CF_2)_2(CH_2)_2SCH_2)_2C(CH_2OH)_2$; $(R_f^1R"SCH_2)_2C(CH_2OH)_2$;

1,4-bis(1-hydroxy-1,1-dihydroperfluoroethoxyethoxy)perfluoro-n-butane ($HOCH_2CF_2OC_2F_4O(CF_2)_4OC_2F_4OCF_2CH_2OH$); 1,4-bis(1-hydroxy-1,1-dihydroperfluoropropoxy)perfluoro-n-butane ($HOCH_2CF_2CF_2O(CF_2)_4OCF_2CF_2CH_2OH$); fluorinated oxetane polyols made by the ring-opening polymerization of fluorinated oxetane such as Poly-3-Fox™ (available from Omnova Solutions, Inc., Akron Ohio); polyetheralcohols prepared by ring opening addition polymerization of a fluorinated organic group substituted epoxide with a compound containing at least two hydroxyl groups as described in U.S. Pat. No. 4,508,916 (Newell et al); and perfluoropolyether diols such as Fomblin™ ZDOL ($HOCH_2CF_2O(CF_2O)_{8-12}(CF_2CF_2O)_{8-12}CF_2CH_2OH$, available from Ausimont) and its derivatives; wherein $R_f^1$ is a perfluorooxyalkyl group having 3 to about 50 carbon atoms with all perfluorocarbon chains present having 6 or fewer carbon atoms, or mixtures thereof, R' is alkyl of 1 to 4 carbon atoms; R" is branched or straight chain alkylene of 1 to 12 carbon atoms, alkylenethio-alkylene of 2 to 12 carbon atoms, alkylene-oxyalkylene of 2 to 12 carbon atoms, or alkylene iminoalkylene of 2 to 12 carbon atoms, where the nitrogen atom contains as a third substituent hydrogen or alkyl of 1 to 6 carbon atoms; and R'" is a straight or branched chain alkylene of 1 to 12 carbon atoms or an alkylene-polyoxyalkylene of formula $C_rH_{2r}(OC_sH_{2s})_t$ where r is 1-12, s is 2-6, and t is 1-40.

Preferred fluorinated polyols include fluorinated oxetane polyols made by the ring-opening polymerization of fluorinated oxetane such as Poly-3-Fox™ (available from Omnova Solutions, Inc., Akron Ohio); polyetheralcohols prepared by ring opening addition polymerization of a fluorinated organic group substituted epoxide with a compound containing at least two hydroxyl groups as described in U.S. Pat. No. 4,508,916 (Newell et al); perfluoropolyether diols such as Fomblin™ ZDOL ($HOCH_2CF_2O(CF_2O)_{8-12}(CF_{12}(CF_2CF_2O)_{8-12}CF_2CH_2OH$ and $HOCH_2CH_2OCH_2CF_2O(CF_2O)_{8-12}(CF_2CF_2O)_{8-12}CF_2CH_2OCH_2CH_2OH$, available from Ausimont); 1,4-bis(1-hydroxy-1,1-dihydroperfluoroethoxyethoxy)perfluoro-n-butane ($HOCH_2CF_2OC_2F_4O(CF_2)_4OC_2F_4OCF_2CH_2OH$); and 1,4-bis(1-hydroxy-1,1-dihydroperfluoropropoxy)perfluoro-n-butane ($HOCH_2CF_2CF_2O(CF_2)_4OCF_2CF_2CH_2OH$) and $CF_3CF_2CF_2$—O—[$CF(CF_3)CF_2O$]$_n$—$CF(CF_3)$—, wherein n is an integer of 3 to 25. This perfluorinated polyether group can be derived from an oligomerization of hexafluoropropylene oxide. Such perfluorinated polyether groups are preferred in particular because of their benign environmental properties.

The fluorochemical urethane comprises, in part, the reaction product of an oligomer derived from ethylenically-unsaturated monomer units having pendent silyl groups ("silane monomers"), the oligomer further having at least one terminal, nucleophilic, isocyanate-reactive functional group. The oligomer has 2-20 repeat units, a carbon-carbon backbone, and is derived from a) ethylenically unsaturated monomer units, preferably (meth)acryloyl monomer units having pendent silyl groups, and b) optionally ethylenically unsaturated monomer units, preferably (meth)acryloyl monomer units having pendent alkyl groups with or without other functional group for coating quality and performance modification, depending on the substrates. The optional functional groups on the (meth)acryloyl monomer units may include, for example, hydroxy, carboxy, thiol, amino functional groups.

The molecular weight and the number of repeat units in the oligomer are controlled by the mole ratio of the monomer units and the chain transfer agent (having an isocyanate-reactive functional group) during the oligomerization. The number of the repeat units of the monomer having with pendent silane group in the oligomer may be adjected to correspond to the molecule weight of $R_f$ for having fluorochemical urethane (I) to provide balanced solubility, compatibility, coating quality and crosslink degree for optimized performance from the coating.

Preferred silane monomers include those with the following formula:

$$A-R^6-Si-(Y)_p(R^7)_{3-p} \quad (V)$$

wherein:

A is an ethylenically unsaturated polymerizable group, including vinyl, allyl, vinyloxy, allyloxy, and (meth)acryloyl, $R^6$ is a covalent bond or a divalent hydrocarbon bridging group of valence In one embodiment $R^6$ is a polyvalent hydrocarbon bridging group of about 1 to 20 carbon atoms, including alkylene and arylene and combinations thereof, optionally including in the backbone 1 to 5 moieties selected from the group consisting of —O—, —C(O)—, —S—, —SO$_2$— and —NR$^4$— groups (and combinations thereof such as —C(O)—O—), wherein $R^4$ is hydrogen, or a $C_1$-$C_4$ alkyl group. In another embodiment, $R^6$ is a poly(alkylene oxide) moiety of the formula —(OCH$_2$CH$_2$—)$_n$(OCH$_2$CH(R$^7$))$_m$—, where wherein n is at least 5, m may be 0, and preferably at least 1, and the mole ratio of n:m is at least 2:1 (preferably at least 3:1).

Preferably, $R^6$ is a divalent alkylene.

Y is a hydrolysable group, $R^7$ is a monovalent alkyl or aryl group, p is 1, 2 or 3, preferably 3.

Useful silane monomers include, for example, 3-(methacryloyloxy) propyltrimethoxysilane, 3-acryloxypropyltrimethoxysilane, 3-acryloyloxypropyltriethoxysilane, 3-(methacryloyloxy)propyltriethoxysilane, 3-(methacryloyloxy)propylmethyldimethoxysilane, 3-(acryloyloxypropyl)methyldimethoxysilane, 3-(methacryloyloxy)propyldimethylethoxysilane, 3-(methacryloyloxy)propyldiethylethoxysilane, vinyldimethylethoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltrisisobutoxysilane, vinyltriisopropenoxysilane, vinyltris(2-methoxyethoxy)silane, and mixtures thereof.

The optional (meth)acrylate ester monomer useful in preparing the oligomer is a monomeric (meth)acrylic ester of a non-tertiary alcohol, which alcohol contains from 1 to 20 carbon atoms and preferably an average of from 4 to 12 carbon atoms, optional with other functional groups.

Examples of monomers suitable for use as the acrylate ester monomer include the esters of either acrylic acid or methacrylic acid with non-tertiary alcohols such as ethanol, 1-propanol, 2-propanol, 1-butanol, 2-butanol, 1-pentanol, 2-pentanol, 3-pentanol, 2-methyl-1-butanol, 1-hexanol, 2-hexanol, 2-methyl-1-pentanol, 3-methyl-1-pentanol, 2-ethyl-1-butanol, 3,5,5-trimethyl-1-hexanol, 3-heptanol, 1-octanol, 2-octanol, isooctylalcohol, 2-ethyl-1-hexanol, 1-decanol, 1-dodecanol, 1-tridecanol, 1-tetradecanol, monoalkyl terminated polyethylene glycol and polypropylene glycol and the like. In some embodiments, the preferred acrylate ester monomer is the ester of acrylic acid with butyl alcohol or isooctyl alcohol, or a combination thereof, although combinations of two or more different acrylate ester monomer are suitable.

Representative examples of functionalized acrylate monomers suitable for use as the acrylate ester monomer include 2-(dimethylamino)ethyl methacrylate, 2-(dimethylamino) ethyl acrylate, 2-(diethylamino)ethyl methacrylate, 2-(diethylamino)ethyl acrylate, 2-(diisopropylamino)ethyl methacrylate, N-(acryloxyethyl) succinimide, 2-(1-aziridinyl)-ethyl methacrylate, glycidyl acrylate, glycidyl methacrylate, 2-hydroxyethyl methacrylate, 2-hydroxyethyl acrylate, 2-hydroxypropyl methacrylate, 2-ethoxyethyl methacrylate, 2-(2-ethoxyethoxy)ethyl acrylate, 2-(methacryloxy)ethyl acetoacetate and 2-allyloxyethyl acrylate, or a combination thereof.

The monomers are polymerized in the presence of a functionalized chain transfer agent to control the molecular weight and the number of repeat units. The chains transfer agent generally has at least one mercapto group (—SH) and at least one nucleophilic, isocyanate-reactive functional group, including hydroxy-, amino and/or mercapto groups. The hydroxy- or amino-functionalized chain transfer agents useful in the preparation of the fluorochemical oligomer preferably correspond to the following formula:

$$HS-R^3-X^3-H \quad (VI), \text{wherein:}$$

$R^3$ is a polyvalent alkylene or arylene groups, or combinations thereof, said alkylene groups optionally containing one or more catenary oxygen atoms;

and $X^3$ is —O—, or —NR$^4$—, where $R^4$ is H or $C_1$-$C_4$ alkyl

Useful functionalized chain transfer agents include those selected from 2-mercaptoethanol, 3-mercapto-2-butanol, 3-mercapto-2-propanol, 3-mercapto-1-propanol, 3-mercapto-1,2-propanediol, 2,3-dimercaptopropanol, 4-mercapto-1-butanol, 6-mercapto-1-hexanol, 8-mercapo-1-octanol, 11-mercapto-1-undecanol, 16-mercapto-1-hexadecanol, hydroxyethyl thioglycolate, 2-hydroxyethyl 3-mercaptopropionate, 1-(9-mercaptononyl)-3,6,9-trioxaundecan-11-ol, (11-mercaptoundecyl)tri(ethylene glycol, 2-[2-(2-mercaptoethoxy)ethoxy]ethanol, and 2-(butylamino) ethanethiol. A single compound or a mixture of different chain transfer agents may be used. The preferred chain transfer agent is 2-mercaptoethanol.

In some embodiments the oligomers are of the formula:

$$X-[M^1]_a-[M^2]_b-S-R-X^3H \quad (VII), \text{wherein}$$

X is H, or the residue of an initiator, $M^1$ is the residue of a an ethylenically unsaturated monomer, preferably a (meth)acryloyl monomer, having a pendent silyl group, $M^2$ is the residue of (meth)acrylate ester monomer, $R^3$ is a divalent alkylene or arylene groups, or combinations thereof, said alkylene groups optionally containing one or more catenary oxygen atoms;

a is at least 2 and b may be 0, preferably a is at least 3, and a+b is 3 to 20; and $X^3$ is —O—, or —NR$^4$—, where $R^4$ is H or $C_1$-$C_4$ alkyl. It will be understood that a and b may be non-integral values, as a mixture of oligomers typically results.

With respect to Formulas I and VII, $R^2$ is of the formula:

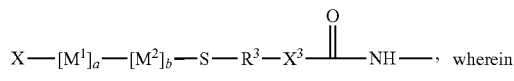
$$X-[M^1]_a-[M^2]_b-S-R^3-X^3-\overset{O}{\underset{\|}{C}}-NH-, \text{ wherein}$$

X is H, or the residue of an initiator, $M^1$ is the residue of a (meth)acrylate monomer having a pendent silyl group, $M^2$ is the residue of (meth)acrylate ester monomer, $R^3$ is a divalent alkylene or arylene groups, or combinations thereof, said alkylene groups optionally containing one or more catenary oxygen atoms; and $X^3$ is —O—, —S— or —NR$^4$—, where $R^4$ is H or $C_1$-$C_4$ alkyl.

In order to prepare the functionalized fluorochemical oligomer, a free-radical initiator is normally present. Such free-radical initiators are known in the art and include azo compounds, such as azobisisobutyronitrile (AIBN) and azobis(2-cyanovaleric acid) and the like, hydroperoxides such as cumene, t-butyl, and t-amyl hydroperoxide, dialkyl peroxides such as di-t-butyl and dicumylperoxide, peroxyesters such as t-butylperbenzoate and di-t-butylperoxy phtalate, diacylperoxides such as benzoyl peroxide and lauroyl peroxide.

The fluorochemical urethane may comprise, in part, the reaction product of the polyisocyanate with a nucleophilic silane compound represented by the general formula:

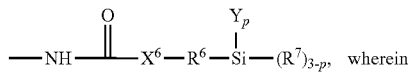

(VIII)

wherein $X^6$ is —O—, —S— or —NR$^5$—, where $R^5$ is H, $C_1$-$C_4$ alkyl or —R$^6$—Si(Y$_p$)(R$^7$)$_{3-p}$, $R^6$ is a divalent alkylene group, said alkylene groups optionally containing one or more catenary oxygen atoms;

Y is a hydrolysable group, $R^7$ is a monovalent alkyl or aryl group, p is 1, 2 or 3, preferably 3. Preferably the nucleophilic silane compounds are aminosilanes.

Some aminosilanes useful in the practice of this disclosure are described in U.S. Pat. No. 4,378,250 (Treadway et al., incorporated herein by reference) and include aminoethyltriethoxysilane, β-aminoethyltrimethoxysilane, β-aminoethyltriethoxysilane, β-aminoethyltributoxysilane, β-aminoethyltripropoxysilane, α-amino-ethyltrimethoxysilane, α-aminoethyltriethoxysilane, γ-aminopropyltrimethoxysilane, γ-aminopropyltrimethoxysilane, γ-aminopropyltriethoxysilane, γ-aminopropyltributoxysilane, γ-aminopropyltripropoxysilane, β-aminopropyltrimethoxysilane, β-aminopropyltriethoxysilane, β-aminopropyltripropoxysilane, β-aminopropyltributoxysilane, α-aminopropyltrimethoxysilane, α-aminopropyltriethoxysilane, α-aminopropyltributoxysilane, α-aminopropyltripropoxysilane, Minor amounts (<20 mole percent) of catenary nitrogen-containing aminosilanes may also be used, including those described in U.S. Pat. No. 4,378,250 (Treadway et al., incorporated herein by reference). N-(β-aminoethyl)-β-aminoethyltrimethoxysilane, N-(β-aminoethyl)-β-aminoethyltriethoxysilane, N-(β-aminoethyl)-β-aminoethyltripropoxysilane, N-(β-aminoethyl)-α-aminoethyltrimethoxysilane, N-(β-aminoethyl)-α-aminoethyltriethoxysilane, N-(β-aminoethyl)-α-aminoethyltripropoxysilane, N-(β-aminoethyl)-β-aminopropyltrimethoxysilane, N-(β-aminoethyl)-γ-aminopropyltriethoxysilane, N-(β-aminoethyl)-γ-aminopropyltripropoxysilane, N-(β-aminoethyl)-γ-aminopropyltrimethoxysilane, N-(β-aminoethyl)-β-aminopropyltriethoxysilane, N-(β-aminoethyl)-β-aminopropyltripropoxysilane, N-(γ-aminopropyl)-β-aminoethyltrimethoxysilane, N-(γ-aminopropyl)-β-aminoethyltriethoxysilane, N-(γ-aminopropyl)-β-aminoethyltripropoxysilane, N-methylaminopropyltrimethoxysilane, β-aminopropylmethyl diethoxysilane, and γ-diethylene triaminepropyltriethoxysilane.

With respect to Formulas I and VII, $R^8$ is of the formula:

wherein

X is —O—, —S— or —NR$^5$—, where $R^5$ is H, $C_1$-$C_4$ alkyl or —R$^6$—Si(Y$_p$)(R$^7$)$_{3-p}$, $R^6$ is a divalent alkylene group, said alkylene groups optionally containing one or more catenary oxygen atoms;

Y is a hydrolysable group, $R^7$ is a monovalent alkyl or aryl group, and p is 1, 2 or 3.

It will be understood that in the presence of water or moisture, the Y groups may hydrolyzed to —OH groups, leading to reaction with a substrate surface with —OH group or self-crosslink by dehydration to form siloxane linkages. Bonds thus formed, particularly Si—O—Si bonds, are water resistant and can provide enhanced durability of the stain-release properties imparted by the chemical compositions of the present disclosure The fluorochemical compounds can be made by simple blending of the nucleophilic oligomer(s) VII, nucleophilic perfluoropolyether compound(s) II, optionally the nucleophilic silane compounds VIII, and the polyisocyanate compound(s), to produce a urethane compound of Formula I.

In general, the polyisocyanate, the nucleophilic perfluoropolyether compound(s) II, a catalyst and a solvent are charged to a dry reaction vessel under nitrogen. The reaction mixture is heated, with a sufficient mixing, at a temperature, and for a time sufficient for the reaction to occur. Then, the pre-prepared nucleophilic oligomer(s) with curable silane VII, was added, optionally with the nucleophilic silane compounds VIII, and the reaction was continued until all reactive isocyanate functional group was consumed. Progress of the reaction can be determined by monitoring the disappearance of the isocyanate peak in the IR at ~2100 cm$^{-1}$.

Depending on reaction conditions (e.g., reaction temperature and/or polyisocyanate used), a catalyst level of up to about 0.5 percent by weight of the reaction mixture may be used to effect the condensation reactions with the isocyanates, but typically about 0.00005 to about 0.5 percent by weight may be used, 0.02 to 0.1 percent by weight being preferred. In general, if the nucleophilic group is an amine group, a catalyst is not necessary.

Suitable catalysts include, but are not limited to, tertiary amine and tin compounds. Examples of useful tin compounds include tin II and tin IV salts such as stannous octoate, dibutyltin dilaurate, dibutyltin diacetate, dibutyltin di-2-ethylhexanoate, and dibutyltinoxide. Examples of useful tertiary amine compounds include triethylamine, tributylamine, triethylenediamine, tripropylamine, bis(dimethylaminoethyl) ether, morpholine compounds such as ethyl morpholine, and 2,2'-dimorpholinodiethyl ether, 1,4-diazabicyclo[2.2.2]octane (DABCO, Aldrich Chemical Co., Milwaukee, Wis.), and 1,8-diazabicyclo[5.4.0.]undec-7-ene (DBU, Aldrich Chemical Co., Milwaukee, Wis.). Tin compounds are preferred. If an acid catalyst is used, it is preferably removed from the product or neutralized after the reaction. It has been found that the presence of the catalyst may deleteriously affect the contact angle performance.

The nucleophilic perfluoropolyether compound $R_f^1$-Q $(X^2H)_z$(II), is used in an amount of 1 to about 50% molar equivalent to the total available isocyanate functional groups. The nucleophilic oligomer (VII) is used in an amount of 33 to about 90% equivalent of the total available isocyanate functional groups. The nucleophilic silane compound (VIII) is used in an amount of 0 to about 33% (preferably 1 to 10%) equivalent of the total available isocyanate functional groups.

The disclosure also provides a coating composition of the fluorochemical urethane compounds of Formula I and a solvent. For certain hardcoat applications, where the coating need be more durable and abrasion resistant, the coating composition may further comprise silicone hardcoat, such as silsesquioxane based hardcoats.

Compositions according to the present disclosure may be coated on a substrate, with or without a primer coating, and at least partially cured to provide a coated article. In some embodiments, the polymerized coating may form a protective coating that provides at least one of abrasive resistance, mar resistance, graffiti resistance, stain resistance, adhesive release, low refractive index, weatherable and water- and oil-repellency, or the combination of more than one performance. Coated articles according to the present disclosure include, for example, eyeglass lenses, face masks, respirators, mirrors, windows, adhesive release liners, and anti-graffiti films.

Suitable substrates include, for example, glass (e.g., windows and optical elements such as, for example, lenses and mirrors), ceramic (e.g., ceramic tile), cement, stone, painted surfaces (e.g., automobile body panels, boat surfaces), metal (e.g., architectural columns), paper (e.g., adhesive release liners), cardboard (e.g., food containers), thermosets, thermoplastics (e.g., polycarbonate, acrylics, polyolefins, polyurethanes, polyesters, polyamides, polyimides, phenolic resins, cellulose diacetate, cellulose triacetate, polystyrene, and styrene-acrylonitrile copolymers), and combinations thereof The substrate may be a film, sheet, or it may have some other form. The substrate may comprise a transparent or translucent display element, optionally having a ceramer hardcoat thereon.

In some embodiments, a coating composition comprising a mixture of the fluorochemical urethane compounds and a solvent is provided. The coating compositions of the present disclosure comprise solvent suspensions, dispersions or solutions of the fluorochemical compounds of the present disclosure. When applied as coatings, the coating compositions impart oil- and water-repellency properties, and/or stain-release and stain-resistance characteristics to any of a wide variety of substrates.

A coating prepared from the coating composition that includes compounds of Formula I includes the compounds per se, as well as siloxane derivatives resulting from bonding to the surface of a preselected substrate and intermolecular crosslinking by siloxane formation. The coatings can also include unreacted or uncondensed "Si—Y" groups. The composition may further contain non-silane materials such as oligomeric perfluorooxyalkyl monohydrides, starting materials and perfluorooxyalkyl alcohols and esters.

Although the inventors do not wish to be bound by theory, compounds of the above Formula I are believed to undergo a condensation reaction with the substrate surface to form a siloxane layer via hydrolysis or displacement of the hydrolysable "Y" groups of Formula I. In this context, "siloxane" refers to —Si—O—Si— bonds to which are attached to compounds of Formula I. In the presence of water, the "Y" groups will undergo hydrolysis to "Si—OH" groups, and further condensation to siloxanes.

The fluorochemical compounds can be dissolved, suspended, or dispersed in a variety of solvents to form coating compositions suitable for use in coating onto a substrate. Generally, the solvent solutions can contain from about 0.1 to about 50 percent, or even up to about 90 percent, by weight based on the total weight of the solid components. Coating compositions preferably contain from about 0.1 to about 10 weight percent fluorochemical urethane compounds, based on the total solids. Preferably the amount of fluorochemical urethane compounds used in the coating is about 0.1 to about 5 weight percent, most preferably from about 0.2 to about 1 weight percent, of the total solids. Suitable solvents include alcohols, esters, ethers, amides, ketones, hydrocarbons, hydrofluorocarbons, hydrofluoroethers, chlorohydrocarbons, chlorocarbons, and mixtures thereof.

For ease of manufacturing and for reasons of cost, the compositions of the present disclosure can be prepared shortly before use by diluting a concentrate of one or more of the compounds of Formula I. The concentrate will generally comprise a concentrated solution of the fluorochemical urethane in an organic solvent. The concentrate should be stable for several weeks, preferably at least 1 month, more preferably at least 3 months. It has been found that the compounds can be readily dissolved in an organic solvent at high concentrations.

The coating compositions of this disclosure optionally contain silsesquioxanes, for the preparation of hardcoat compositions. The silsesquioxanes may be blended with the coating composition, or alternatively and coating of the compounds of Formula I may be coated on a previously applied coating of the silsesquioxanes. Useful silsesquioxanes include e.g., condensates of trialkoxysilanes (or hydrolysates thereof) and colloidal silica; co-condensates of diorganooxysilanes (or hydrosylates thereof) of the formula $R^{10}_2Si(OR^{11})_2$ with trialkoxysilanes (or hydrosylates thereof) and colloidal silica; and mixtures thereof. The condensates and co-condensates are of the formula $R^{10}SiO_{3/2}$ where each $R^{10}$ is an alkyl group of 1 to 6 carbon atoms or an aryl group and $R^{11}$ represents an alkyl radical with 1 to 4 carbon atoms. Preferred silsesquioxanes are neutral or anionic silsesquioxanes, prior to addition to the composition.

A useful method of making the silsesquioxane-based hardcoat compositions includes hydrolysis of the alkoxysilanes in the presence of colloidal silica dispersion and in a mixture of water and alcoholic solvents. The colloidal silica dispersions preferably have a particle size from 5 nm to 150 nm, or even from 10 nm to 30 nm. Useful colloidal silica dispersions are commercially available under a variety of trade designations from E.I. duPont and Nalco Chemical including the LUDOX trade designation from E.I. duPont de Nemours and Co., Inc. (Wilmington, Del.) and the NALCO trade designation from Nalco Chemical Co. (Oak Brook, Ill.). Useful silsesquioxanes can be made by a variety of techniques including the techniques described in U.S. Pat. No. 3,986,997 (Clark), U.S. Pat. No. 4,624,870 (Anthony) and U.S. Pat. No. 5,411,807 (Patel et al.), and incorporated by reference. The silsesquioxane-based hard-coat composition is present in the hard-coat composition in an amount of from about 90% by weight to about 99.9% by weight based on the total solids of the hard-coat composition.

Another useful method of preparing a silsesquioxane-based hard-coat composition includes adding hydrolysable silane to a mixture of colloidal silica dispersion, water and optionally materials such as surface active agent and organic water-miscible solvent, while agitating the mixture under acidic or basic conditions. The exact amount of silane that can be added depends on the substituent R and whether an anionic or cationic surface-active agent is used. Co-condensates of the silsesquioxanes in which the units can be present in block or random distribution are formed by the simultaneous hydrolysis of the silanes. The amount of tetraorganosilanes (including, e.g., tetraalkoxysilanes and hydrosylates thereof (e.g. tetraalkoxysilanes of the formula $Si(OH)_4$, and oligomers thereof) present is less than 10% by weight, less than 5% by weight, or even less than about 2% by weight based on the solids of the silsesquioxane-based hard-coat composition. After hydrolysis is complete, the product may be diluted with additional solvent and additives may be added including, e.g., UV absorbers, buffers (e.g., methyltriacetoxysilane (e.g., for silsesquioxane-based hard-coat compositions that are made with basic colloidal silica), antioxidants, cure catalysts (e.g., amine carboxylates such as ethylamine carboxylate, and quaternary ammonium carboxylates such as benzyltrimethylammonium acetate), and combinations thereof.

Silanes useful in preparing the silsesquioxane-based hard coat compositions include, e.g., methyltrimethoxysilane, methyltriethoxysilane, methyltriisopropoxyoxysilane, ethyltrimethoxysilane, ethyltriethoxysilane, propyltrimethoxysilane, isobutyltrimethoxysilane, isobutyltriethoxysilane, 2-ethylbutyltriethoxysilane, 2-ethylbutoxytriethoxysilane, and combinations thereof. Commercially available silicone hardcoat compositions that may be used in the present disclosure include SHC-1200™, SHC-5020™ and AS4000™ hardcoats from GE Bayer Silicones, Waterford, N.Y.

The composition may be applied to the substrate by conventional techniques such as, for example, spraying, knife coating, notch coating, reverse roll coating, gravure coating, dip coating, bar coating, flood coating, dip coating or spin coating. The composition may be applied to any thickness to provide the desired level of water, oil, stain, and soil repellency. Typically, the composition is applied to the substrate as a relatively thin layer resulting in a dried cured layer having a thickness in a range of from about 40 nm to about 60 nm, although thinner and thicker (e.g., having a thickness up to 100 micrometers or more) layers may also be used. Next, any optional solvent is typically at least partially removed (e.g., using a forced air oven), and the composition is then at least partially cured to form a durable coating.

A preferred coating method for application of a fluorochemical urethane silane of the present disclosure includes dip coating. A substrate to be coated can typically be contacted with the treating composition at room temperature (typically, about 20 to about 25° C.). Alternatively, the mixture can be applied to substrates that are preheated at a temperature of for example between 60 and 150° C. This is of particular interest for industrial production, where e.g. ceramic tiles can be treated immediately after the baking oven at the end of the production line. Following application, the treated substrate can be dried and cured at ambient or elevated temperature, e.g. at 40 to 300° C. and for a time sufficient to dry. The process may also require a polishing step to remove excess material.

The present disclosure provides a protective coating on substrate that is relatively durable, and more resistant to contamination and easier to clean than the substrate surface itself. The present disclosure provides in one embodiment a method and composition for use in preparing a coated article comprising a substrate, preferably a hard substrate, and an antisoiling coating of greater than a monolayer (which is typically greater than about 15 Angstroms thick deposited thereon. Preferably an antisoiling coating of the present disclosure is at least about 20 Angstroms thick, and more preferably, at least about 30 Angstroms thick. Generally, the thickness of the coating is less than 10 micrometers, preferably less than 5 micrometers. The coating material is typically present in an amount that does not substantially change the appearance and optical characteristics of the article.

EXAMPLES

Objects and advantages of this disclosure are further illustrated by the following examples, but the particular materials and amounts thereof recited in these examples, as well as other conditions and details, should not be construed to unduly limit this disclosure. These examples are merely for illustrative purposes only and are not meant to be limiting on the scope of the appended claims.

All parts, percentages, ratios, etc. in the examples and the rest of the specification are by weight, unless noted otherwise. Solvents and other reagents used were obtained from Aldrich Chemical Company, Milwaukee, Wis. unless otherwise noted.

Test Methods

IR Spectroscopy (IR)

IR spectra are run on a Thermo-Nicolet, Avatar 370 FTIR, obtainable from Thermo Electron Corporation, Waltham, Mass.

Contact Angle Measurement:

The coated panels (described below) were rinsed for 1 minute by hand agitation in isopropanol before being subjected to measurement of water and hexadecane contact angles. Measurements were made using as-received reagent-grade hexadecane (Aldrich) and deionized water filtered through a filtration system obtained from Millipore Corporation (Billerica, Mass.), on a video contact angle analyzer available as product number VCA-2500XE from AST Products (Billerica, Mass.). Reported values are the averages of measurements on at least three drops measured on the right and the left sides of the drops. Drop volumes were 5 µL for static measurements and 1-3 µL for advancing and receding contact angles.

Marker Repellent Test:

This test was used to measure the ink repellency of the coatings. Coated plaques were prepared as described above. A line was drawn across the surface of a coated plaque using a Sharpie™ Fine Point, Series 30000 permanent marker, Vis-à-vis Permanent Overhead Project Pen or KING SIZE Permanent Marker (available from Sanford, a division of Newell Rubbermaid). The samples were rated for appearance and for the ability to repel markers as indicated below:

| Ink Repellency Test Ratings | |
|---|---|
| Ranking | Description |
| 1 | Ink beaded in dot |
| 2 | Ink beaded in short line |

-continued

Ink Repellency Test Ratings

| Ranking | Description |
|---------|-------------|
| 3 | Some beading |
| 4 | Little beading |
| 5 | No beading |

Solvent Resistant Test:

On the coated and cured film, an ~0.5 inch (~1.27 cm) diameter drop of solvent (as indicated below) was applied to the coated surface. The appearance of the coating was visually rated and recorded after the solvent was evaporated to dry at room temperature. In the Tables, "C" is for Clear (no change of the coating appearance). Then, the Marker Repellent Test was conducted over the solvent dried spot using a Sharpie™ Fine Point, Series 30000 permanent marker and the samples were rated from 1 to 5 according to the scale above. Reported values are the average of three time ratings.

Steel Wool Durability Test

The abrasion resistance of the coated substrates was tested perpendicular to the coating direction by use of a mechanical device capable of oscillating a steel wool sheet adhered to a stylus across the film's surface. The stylus oscillated over a 90 mm wide sweep width at a rate of 315 mm/sec (3.5 wipes/sec) wherein a "wipe" is defined as a single travel of 90 mm. The stylus had a flat, cylindrical base geometry with a diameter of 3.2 cm. The stylus was designed to enable attachment of additional weights to increase the force exerted by the steel wool normal to the film's surface. The samples are tested at a 400 g load for 50 wipes. The #0000 steel wool sheets are "Magic Sand-Sanding Sheets" (Hut Products, Fulton, Mo.). The #0000 has a specified grit equivalency of 600-1200 grit sandpaper. The 3.2 cm steel wool discs are die cut from the sanding sheets and adhered to the 3.2 cm stylus base with 3M Brand Scotch Permanent Adhesive Transfer tape (3M, St. Paul, Minn.). The appearance of the coating is visionally rated (scratched or not) after the durability test. The contact angles were measured on the wear track after the steel wool abrasion, and on an area of the plaque adjacent to the wear track that is not affected by the steel wool track (i.e., before steel wool testing). The contact angle measurements are made using the "Contact Angle Measurement" measurement. Unless otherwise noted, the data is reported based on an average of three measurements. Three drops are placed on each plaque. The contact angle is measured on the right and left sides of each drop.

Cleaning Tissue Durability Test

The coated polycarbonates were cleaned with Sight Savers Pre-moistened Lens Cleaning Tissue (Bausch & Lomb), back and forth for one hundred times, unless specifically noted. Then, the cleaned area was dried and tested with Sharpie marker, and rated according to Marker Repellent Test.

Materials:

Unless otherwise noted, as used in the examples:

"HFPO-" refers to the end group $F(CF(CF_3)CF_2O)_aCF(CF_3)$— of the methyl ester $F(CF(CF_3)CF_2O)_aCF(CF_3)C(O)OCH_3$, with an average molecular weight >1000 g/mol, can be prepared according to the method reported in U.S. Pat. No. 3,250,808 (Moore et al.). HFPO—C(O)N(H)CH$_2$CH$_2$OH (HFPO—OH or HFPO) was prepared by a procedure similar to that described in U.S. Pat. No. 7,094,829 (Audenaert et al.).

"A-174" is $CH_2$=$C(CH_3)C(O)OCH_2CH_2CH_2Si(OCH_3)_3$, available from Union Carbide.

Desmodur™ N-100 polyisocyanate—a triisocyanate-functional biuret derived from reacting 3 moles of 1,6-hexamethylene diisocyanate with I mole of water (available from Bayer Polymers LLC, of Pittsburgh, Pa.).

Desmodur™ N-3300 Isocyanate—a triisocyanate-functional isocyanurate derived from trimerizing 3 moles of 1,6-hexamethylene diisocyanate (available from Bayer Polymers LLC, of Pittsburgh, Pa.).

"IPDI" is Isophonone diisocyanate, 98% (MW=222.29), obtained from Aldrich.

"APTMS" is aminopropyltrimethoxysilane, obtained from Sigma-Aldrich of Milwaukee, Wis.

"SHP 401 Primer", is a ~2% solution of poly(methyl methacylate) obtained from GE Silicones of Waterford, N.Y.

"DBTDL" is di-n-butyl dilaurate, obtained from Aldrich.

Polycarbonate plaques used in the testing were molded by Minnesota Mold & Engineering, Vadnais Heights, Minn. from GE Lexan 101, from GE, Mount Vernon, Ind.

Glass Micro Slides used in the testing are No. 2947; 75×50 mm Plane, from Corning Glass Works, Scientific Glassware Dept., Corning, N.Y. 14830.

"SH-1" is GE SHC1200™ Optical Grade Abrasion-Resistant Silicone Hard Coat, obtained from GE Silicones of Waterford, N.Y.

"SH-2" is GE SHC 5020™ Abrasion-Resistant Silicone Hard Coat, obtained from GE Silicones of Waterford, N.Y.

"SH-3" is GE AS4000™ Weatherable Abrasion-Resistant Silicone Hard Coat, obtained from GE Silicones of Waterford, N.Y.

"TEOS" is tetraethoxysilane, available from Aldrich.

"Vazo-67" is 2,2'-azobis(2-methlbutyronitrile), commercially available from DuPont Chemical Company, Wilmington, Del.

Preparation of SAO-1 Silane Acrylate Oligomer Alcohol:

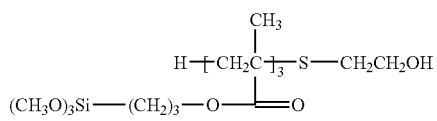

An 8 oz (237 mL) bottle was charged with 14.90 g A-174 (MW=248.4, 60 mmol), 1.56 g HSCH$_2$CH$_2$OH (MW=78, 20 mmol), 38.4 g ethyl acetate and 0.3 g Vazo-67. After bubbling the solution with nitrogen for 1 minute, the sealed bottle was polymerized in a 70° C. oil bath with a magnetic stirring for 24 hours, which gave a clear solution having 30% solids. From FTIR analysis, no $CH_2$=CMeC(O)— signal was observed, indicating the completed oligomerization (average molecular weight=822):

Preparation of SAO-2, Silane Acrylate Oligomer Alcohol:

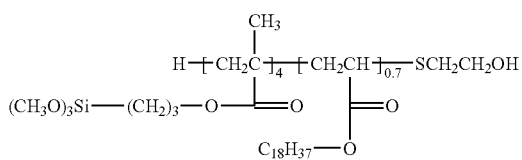

An 8 oz (~237 mL) bottle was charged with 39.74 g A-174 (MW=248.4, 160 mmol), 8.70 g octadecyl acrylate (MW=324, 26.8 mmol), 3.12 g HSCH$_2$CH$_2$OH (MW=78, 40 mmol), 103.3 g ethyl acetate and 10 g Vazo-67. After bubbling the solution with nitrogen for 1 minute, the sealed bottle was polymerized in a 70° C. oil bath with a magnetic stirring for 10 hours. Additional 0.70 g Vazo-67 was added and the oligomerization was continued for another 14 hours, which gave a clear solution having 33% solids. From FTIR analysis, no CH$_2$=CMeC(O)— signal was observed, indicating the completed oligomerization (average molecular weight=1294).

Preparation of Perfluoropolyether Urethanes:

FA-1, HFPO—OH/N100/SAO-1/APTMS (in 1/3/1/1 Equivalent Ratio):

An 8 Oz (~237 mL) bottle was charged with 5.73 g N100 (EW=190, 30 mmol), 13.14 g HFPO—OH (MW=1314, 10 mmol), 27.4 g 30% SAO-1 (8.22 g solid, 10 mmol), 49.5 g EtOAc solvent and 5 drops of DBTDL catalyst. The sealed bottle was reacted at 70° C. oil bath with a magnetic stirring for 4 hours. Then, 2.21 g APTMS (10 mmol) was added at room temperature, and the mixture was reacted at room temperature for 0.5 hour, followed by reaction at 70° C. for another 4 hours. A 30% solids clear solution in was obtained. From FTIR analysis, no unreacted —NCO signal was observed, indicating the completed reaction.

FA-2, HFPO—OH/N3300/SAO-1/APTMS (in 1/3/1/1 Equivalent Ratio):

FA-2 was prepared by similar procedure to FA-1, with 5.76 g N3300 in replacement of N100.

FA-3, HFPO—OH/N100/SAO-2 (in 1/3/2 Equivalent Ratio):

An 8 Oz (~237 mL) bottle was charged with 2.93 g N100 (EW=190, 15.34 meq), 6.71 g HFPO—OH (MW=1314, 5.1 meq), 38.90 g 33% SAO-2 (12.99 g solid, 10 meq OH), 22.5 g ethyl acetate and 4 drops of DBTDL catalyst. The sealed bottle was reacted at 70° C. oil bath with a magnetic stirring for 8 hours. From FTIR analysis, no unreacted —NCO signal was observed, indicating the completed reaction.

FA-4, HFPO—OH/N100/SAO-2 (in 0.70/3/2.25 Equivalent Ratio):

An 8 Oz (~237 mL) bottle was charged with 2.55 g N100 (EW=190, 13.35 meq NCO), 4.20 g HFPO—OH (MW=1344, 3.12 meq), 38.90 g 33% SAO-2 (12.99 g solid, 10 meq OH), 20 g EtOAc solvent and 4 drops of DBTDL catalyst. The sealed bottle was reacted at 70° C. oil bath with a magnetic stirring for 8 hours. From FTIR analysis, no unreacted —NCO signal was observed, indicating the completed reaction.

FA-5, HFPO—OH/IPDI/SAO-2 (in 1/2/1 Equivalent Ratio):

An 8 Oz (~237 mL) bottle was charged with 2.04 g IPDI (MW=222.29, 9.17 mmol), 12.05 g HFPO—OH (MW=1344, 9.17 mmol), 33 g MEK solvent and 4 drops of DBTDL catalyst. The sealed bottle was reacted at 70° C. oil bath with a magnetic stirring for 2 hours giving a clear solution. Then, 36.0 g 33% SAO-2 (11.88 g solid, 9.17 mmol) was added at room temperature, and the mixture was reacted at 70° C. for another 4 hours. From FTIR analysis, no unreacted —NCO signal was observed, indicating the completed reaction.

Coating on Polycarbonate (PC):

A polycarbonate substrate (10 cm by 10 cm) was coated with hard-coat coating compositions using the dip coating process. Primer (SHP 401) and silicone hardcoats (SH-1, SH-2 and SH-3) were used as received. The 30% fluorochemical additive solutions in ethyl acetate were first diluted to 0.5% with methanol, then added to 18% SHC1200 hardcoat at 0.3% to 0.5% by weight. To form the coatings, each polycarbonate plaque was first immersed into a solution of SHP 401 primer at a rate of 90 cm per minute. Once the entire substrate was immersed in the primer, the substrate was removed from the primer at a rate of 90 cm per minute and was allowed to air dry at room temperature for 10 minutes. The dried substrate was then immersed into a solution of silicone hardcoat or a solution of silicone hardcoat containing 0.3~0.5 weight percent of a fluorinated urethane acrylate silane oligomer (unless otherwise noted), at a rate of 90 cm per minute and withdrawn at a rate of 19 cm per minute, air dried at room temperature for 20 minutes and finally heated in an oven for 30 minutes at 130° C.

The coated, cured polycarbonate plaques were tested for coating quality and marker repellency on coated polycarbonate as shown in Table 1. The coating quality was determined visually. Those that were defect-free coatings were rated excellent, and those with minor defects were rated good.

TABLE 1

Coating Quality and Marker Repellent Test

| Formulation No# | Formulation | Coating Quality | Marker Repellent | | |
|---|---|---|---|---|---|
| | | | Sharpie | Vis-à-Vis | King Size |
| 1 | 0.3% FA-1 in SH-1 | Excellent | 1 | 1 | 3 |
| 2 | 0.5% FA-1 in SH-1 | Good | 1 | 1 | 1 |
| 3 | 0.3% FA-1 in SH-2 | Excellent | 1 | 1 | 1 |
| 4 | 0.3% FA-1 in SH-3 | Excellent | 1 | 1 | 1 |
| 5 | 0.3% FA-2 in SH-1 | Excellent | 1 | 2 | 3 |
| 6 | 0.5% FA-2 in SH-1 | Good | 1 | 1 | 1 |
| 7 | 0.3% FA-3 in SH-1 | Excellent | 1 | 1 | 1 |
| 8 | 0.5% FA-3 in SH-1 | Good | 1 | 1 | 1 |
| 9 | 0.3% FA-4 in SH-1 | Excellent | 1 | 1 | 2 |
| 10 | 0.5% FA-4 in SH-1 | Excellent | 1 | 1 | 1 |
| 11 | 0.3% FA-5 in SH-2 | Excellent | 1 | 1 | 1 |
| 12 | 0.3% FA-5 in SH-3 | Excellent | 1 | 1 | 1 |
| C-1 | PC (no coating) | Excellent | 5 | 5 | 5 |
| C-2 | SH-1 | Excellent | 5 | 5 | 5 |
| C-3 | SH-2 | Excellent | 5 | 5 | 5 |
| C-4 | SH-3 | Excellent | 5 | 5 | 5 |

From Table 1, all these fluorinated urethane acrylate silane oligomers have good compatibility with silicone hardcoats, and provided good repellency to different markers, indicating the low surface energy and low adhesion for stain and paint.

Table 2 shows the advancing (Adv), receding (Rec), and static contact angle data from the coated plaques of Table 1. The reported data are an average of at least two measurements.

TABLE 2

Water and hexadecane (HD) contact angle measurements.

| No# Formulation | Formulation | H₂O Adv | H₂O Rec | H₂O Static | HD Adv | HD Rec | HD Static |
|---|---|---|---|---|---|---|---|
| 1 | 0.3% FA-1 in SH-1 | 108 | 84 | 106 | 73 | 63 | 71 |
| 2 | 0.5% FA-1 in SH-1 | 114 | 83 | 106 | 72 | 63 | 70 |
| 3 | 0.3% FA-1 in SH-2 | 111 | 68 | 102 | 69 | 56 | 67 |
| 4 | 0.3% FA-1 in SH-3 | 119 | 75 | 111 | 73 | 57 | 71 |
| 5 | 0.3% FA-2 in SH-1 | 111 | 76 | 109 | 72 | 53 | 70 |
| 7 | 0.3% FA-3 in SH-1 | 109 | 78 | 106 | 70 | 43 | 67 |
| 9 | 0.3% FA-4 in SH-1 | 105 | 84 | 104 | 64 | 42 | 61 |
| 11 | 0.3% FA-5 in SH-2 | 114 | 75 | 105 | 73 | 57 | 71 |
| 12 | 0.3% FA-5 in SH-3 | 118 | 76 | 106 | 76 | 50 | 74 |

TABLE 3 solvent resistant performance from the coated plaques of Table 1.

| Formulation No# | IPA | Toluene | MIBK | Acetone | EtOAc | MEK | DMF |
|---|---|---|---|---|---|---|---|
| 1 | C/1 | C/1 | C/1 | C/1 | C/1 | C/1 | C/1 |
| 3 | C/1 | C/1 | C/1 | C/1 | C/1 | C/1 | C/1 |
| 4 | C/1 | C/1 | C/1 | C/1 | C/1 | C/1 | C/1 |
| 5 | C/1 | C/1 | C/1 | C/1 | C/1 | C/1 | C/1 |
| 7 | C/1 | C/1 | C/1 | C/1 | C/1 | C/1 | C/1 |
| 8 | C/1 | C/1 | C/1 | C/1 | C/1 | C/1 | C/1 |
| 9 | C/1 | C/1 | C/1 | C/1 | C/1 | C/1 | C/1 |
| 11 | C/1 | C/1 | C/1 | C/1 | C/1 | C/1 | C/1 |
| 12 | C/1 | C/1 | C/1 | C/1 | C/1 | C/1 | C/1 |
| C-2 | C/5 | C/5 | C/5 | C/5 | C/5 | C/5 | C/5 |

The coated polycarbonates were cleaned with Savers Premoistened Lens Cleaning Tissue (Bausch & Lomb), back and forth for one hundred times. Then, the cleaned part was dried and tested with Sharpie marker, and the rating results are recorded in Table 4, which shows no effect on the marker repellent after cleaning 100 times with IPA contained Lens Cleaning Tissue.

TABLE 4

Durability with Sight Savers ™ Lens Cleaning Tissue

| Formulation No# | Coating Appearance | Repellent to Sharpie, Rating |
|---|---|---|
| 1 | No change | Yes, 1 |
| 2 | No change | Yes, 1 |
| 3 | No change | Yes, 1 |
| 4 | No change | Yes, 1 |
| 5 | No change | Yes, 1 |
| 7 | No change | Yes, 1 |
| 8 | No change | Yes, 1 |
| 9 | No change | Yes, 1 |
| 10 | No change | Yes, 1 |

The results after steel wool test (50 wipes at 400 g load) are summarized in Table 5. In comparison with the results before Steel Wool test, these hardcoats showed good durability to steel wool abrasion.

TABLE 5

Durability with Steel Wool Test

| Formulation No# | Coating Surface | Sharpie Repellent | H₂O Adv/Rec/Static (After Steel wool Test) | HD Adv/Rec/Static (After Steel wool Test) |
|---|---|---|---|---|
| 1 | No scratch | Yes | 108/73/104 | 72/60/69 |
| 3 | No scratch | Yes | 108/74/106 | 66/50/63 |
| 4 | No scratch | Yes | 98/71/98 | 70/53/69 |
| 5 | No scratch | Yes | 110/70/105 | 71/54/70 |
| 7 | No scratch | Yes | 96/68/90 | 71/49/63 |
| 9 | No scratch | Yes | 104/69/101 | 66/39/66 |
| 11 | No scratch | Yes | 101/72/100 | 69/49/68 |
| 12 | No scratch | Yes | 116/81/108 | 73/59/70 |

Coating on Poly(Methyl Methacrylate) Sheet, PMMA:

By using similar coating process for polycarbonate, the silicone hardcoats with fluorochemical additives were coated on poly(methyl methacrylate) sheet and cured, except no primer was needed. Representative results are shown in Table 6 (formulations, coating quality and marker repellent) and Table 7 (contact angles).

TABLE 6

Coating Quality and Marker Repellent Test

| Formulation No# | Formulation | Coating Quality | Marker Repellent Sharpie | Marker Repellent Vis-à-Vis | Marker Repellent King Size |
|---|---|---|---|---|---|
| 1 | 0.3% FA-1 in SH-1 | Fair | 1 | 1 | 1 |
| 3 | 0.3% FA-1 in SH-2 | Excellent | 1 | 3 | 2 |
| 5 | 0.3% FA-2 in SH-1 | Fair | 1 | 1 | 2 |
| 7 | 0.3% FA-3 in SH-1 | Good | 2 | 1 | 3 |
| 9 | 0.3% FA-4 in SH-1 | Excellent | 2 | 1 | 2 |
| 12 | 0.3% FA-5 in SH-3 | Excellent | 1 | 2 | 2 |
| C-2 | HS-1 (No FA) | Good | 5 | 5 | 5 |
| C-5 | PMMA | N/A | 5 | 5 | 5 |

TABLE 7

Contact Angles

| Formulation No# | Formulation (FA) | H₂O Adv | H₂O Rec | H₂O Static | HD Adv | HD Rec | HD Static |
|---|---|---|---|---|---|---|---|
| 1 | 0.3% FA-1 in SH-1 | 120 | 80 | 107 | 69 | 60 | 68 |
| 3 | 0.3% FA-1 in SH-2 | 105 | 78 | 99 | 56 | 38 | 54 |
| 5 | 0.3% FA-2 in SH-1 | 117 | 78 | 109 | 71 | 53 | 69 |
| 7 | 0.3% FA-3 in SH-1 | 108 | 74 | 101 | 67 | 39 | 63 |
| 9 | 0.3% FA-4 in SH-1 | 109 | 78 | 104 | 63 | 34 | 61 |
| 12 | 0.3% FA-5 in SH-3 | 115 | 79 | 104 | 63 | 33 | 63 |

Solvent resistance test results were summarized in Table 8.

TABLE 8

Solvent Resistance Performance

| Formulation No# | IPA | Toluene | MIBK | Acetone | EtOAc | MEK | DMF |
|---|---|---|---|---|---|---|---|
| 1 | C/1 | C/1 | C/1 | C/1 | C/1 | C/1 | C/1 |
| 3 | C/1 | C/1 | C/1 | C/1 | C/1 | C/1 | C/1 |
| 5 | C/1 | C/1 | C/1 | C/1 | C/1 | C/1 | C/1 |

TABLE 8-continued

Solvent Resistance Performance

| Formulation No# | IPA | Toluene | MIBK | Acetone | EtOAc | MEK | DMF |
|---|---|---|---|---|---|---|---|
| 7 | C/1 | C/1 | C/1 | C/1 | C/1 | C/1 | C/1 |
| 9 | C/1 | C/1 | C/1 | C/1 | C/1 | C/1 | C/1 |
| 12 | C/1 | C/1 | C/1 | C/1 | C/1 | C/1 | C/1 |
| Control-2 | C/5 | C/5 | C/5 | C/5 | C/5 | C/5 | C/5 |

The coated poly(methyl methacrylate) (PMMA) sheets were cleaned with Savers Pre-moistened Lens Cleaning Tissue (Bausch & Lomb), back and forth for one hundred times. After drying, the cleaned area was dried and tested with Sharpie marker, and the rating results are recorded in Table 9.

TABLE 9

Durability with Sight Savers Lens Cleaning Tissue

| Formulation No# | Formulation | Coating Appearance | Sharpie Repellent, Rating |
|---|---|---|---|
| 1 | 0.3% FA-1 in SH-1 | No change | Yes, 1 |
| 5 | 0.3% FA-2 in SH-1 | No change | Yes, 1 |
| 7 | 0.3% FA-3 in SH-1 | No change | Yes, 1 |
| 9 | 0.3% FA-4 in SH-1 | No change | Yes, 1 |

The coated polycarbonates were test with Steel Wool by 1.25 inch stylus, rubbed 50 times at 400 g weight. The results after steel wool test were summarized in Table 10, in comparison with that before Steel wool test from Table 7.

TABLE 10

Durability with Steel Wool Test

| Formulation No# | Coating Surface | Sharpie Repellent | Contact Angle (Adv/Rec/Static) After Steel wool Test | |
|---|---|---|---|---|
| | | | $H_2O$ | HD |
| 1 | No scratch | Yes | 109/75/101 | 72/57/71 |
| 5 | No scratch | Yes | 112/76/108 | 68/51/70 |
| 7 | No scratch | Yes | 97/70/92 | 64/36/62 |
| 9 | No scratch | Yes | 105/71/102 | 63/34/63 |

Coating on Glass:

Selected formulations of silicone hardcoat with fluorochemical additives (0.3% by weight) were dip-coated on glass by similar process as before. After dip-coated, the glass slides were cured at 100° C. for 10 minutes. The representative contact angle data from the coated glass are summarized in Table 11.

TABLE 11

Contact Angles

| Formulation No# | Coating Quality | Repellent to Sharpie | $H_2O$ | | | HD | | |
|---|---|---|---|---|---|---|---|---|
| | | | Adv | Rec | Static | Adv | Rec | Static |
| 1 | OK | 4 | 115 | 70 | 105 | 75 | 68 | 70 |
| 7 | OK | 4 | 111 | 73 | 103 | 65 | 40 | 61 |
| 9 | OK | 4 | 106 | 73 | 101 | 63 | 37 | 58 |

Although reasonable water and oil contact angle results were obtained, the coating generally showed fair marker repellent and durability. It was found that the marker repellent and durability could be improved when more additive was used with thinner coating. Table 12 summarized the corresponding marker repellent and contact angles from representative coating formulations of SH-1 with different amount of FA-1 at different coating concentration.

TABLE 12

Contact Angles and Marker Repellent Test

| Formulation No# | Formulation | Coating %* | Coating Quality | H2O Adv/Rec/Static | HD Adv/Rec/Static | Marker Repellent** |
|---|---|---|---|---|---|---|
| 13 | 0.3% FA-1 in SH-1 | 9.00% | Excellent | 105 76 101 | 49 36 48 | 4/4/3 |
| 14 | 0.9% FA-1 in SH-1 | 9.00% | Excellent | 113 69 107 | 73 54 71 | 2/1/1 |
| 15 | 1.7% FA-1 in SH-1 | 9.00% | Excellent | 111 72 106 | 71 55 69 | 1/1/1 |
| 16 | 0.3% FA-1 in SH-1 | 4.50% | Excellent | 100 74 91 | 45 32 44 | 5/4/3 |
| 17 | 3.8% FA-1 in SH-1 | 4.50% | Excellent | 110 75 99 | 72 54 70 | 1/1/1 |
| 18 | 7.3% FA-1 in SH-1 | 4.50% | Excellent | 112 73 102 | 68 52 68 | 1/1/1 |
| 19 | 10% FA-1 in SH-1 | 4.50% | Excellent | 106 77 101 | 71 53 70 | 1/1/1 |

*Diluted with methanol;
**the order of marker repellent, Sharpie/Vis-à-vis/KingSize.

For general application, the curing at room temperature provides good performance of the coated substrates. Coating on glass with 2% coating solutions and cured at room temperature for 24 hours was conducted. The coated glasses were evaluated showed good durability. No coating appearance change was observed after 20 times wipe with Surpass facial tissue (Kimberly-Clark) durability test. Table 13 summarized the contact angle data before and after durability test.

TABLE 13

Durability and Contact Angle

| Formulation No# | Formulation (2%) | Before wipe H₂O Adv/Rec/Static | | | After wipe H₂O Adv/Rec/Static | | |
|---|---|---|---|---|---|---|---|
| C-2 | SH-1 | 98 | 64 | 94 | 44 | 27 | 43 |
| 20 | 5% FA-1 in SH-1 | 117 | 65 | 104 | 110 | 48 | 103 |
| 21 | 7% FA-1 in SH-1 | 116 | 62 | 102 | 107 | 47 | 100 |
| 22 | 9% FA-1 in SH-1 | 116 | 59 | 105 | 108 | 45 | 101 |
| 23 | 11% FA-1 in SH-1 | 113 | 60 | 102 | 95 | 35 | 89 |
| 24 | 13% FA-1 in SH-1 | 115 | 43 | 107 | 106 | 37 | 99 |
| 25 | 16% FA-1 in SH-1 | 115 | 59 | 105 | 113 | 48 | 103 |
| 26 | 20% FA-1 in SH-1 | 112 | 55 | 106 | 78 | 44 | 73 |

Fluorochemical urethane silanes, FA-1 and FA-4 (diluted with MEK to 1%), were also formulated with 1% HCl—H₂O catalyst, with and without TEOS (1% in MEK), and dip-coated on cleaned glass slides, and cured at room temperature for 24 hours. The measured static contact angles were summarized in Table 14.

TABLE 14

Contact Angles

| Formulation No# | Formulation* | Curing Conditions | Static H₂O Contact Angle | Static HD Contact Angle |
|---|---|---|---|---|
| 27 | FA-1/HCl-H₂O (1/1 by weight) | RT 24 hours | 85 | 71 |
| 28 | FA-4/HCl-H₂O (1/1 by weight) | 90° C. 30 min. | 90 | 42 |
| 29 | FA-4/HCl-H₂O (5/1 by weight) | RT 24 hours | 94 | 55 |
| 30 | FA-1/TEOS/HCl-H₂O (1/4/1 by weight) | RT 24 hours | 96 | 71 |
| 31 | FA-4/TEOS/HCl-H₂O (1/4/1 by weight) | RT 24 hours | 83 | 34 |

*FA-1, FA-4 and TEOS were diluted with MEK to 1% solution; HCl-H₂O was 1% HCl in water; The formulated coating solution was standing at room temperature for half hour before dip-coating.

The invention claimed is:

1. A fluorochemical urethane comprising the reaction product of:
   a) a polyisocyanate,
   b) an isocyanate-reactive perfluoropolyether compound is of the formula:

$R_f^1$-[Q-X²—H]$_z$, wherein $R_f^1$ is a monovalent perfluorooxyalkyl group or a divalent perfluorooxyalkylene group of the formula W—$R_f^3$—O—$R_f^4$—($R_f^5$)$_q$—, wherein W is F for monovalent perfluorooxyalkyl, and an open valence ("–") for divalent perfluorooxyalkylene;

$R_f^3$ represents a perfluoroalkylene group,
   $R_f^4$ represents a perfluoroalkyleneoxy group consisting of perfluorooxyalkylene groups having 1, 2, 3 or 4 carbon atoms or a mixture of such perfluorooxyalkylene groups,
   $R_f^5$ represents a perfluoroalkylene group, and
   q is 0 or 1,
   Q is a covalent bond, or a polyvalent alkylene group of valency z, said alkylene optionally containing one or more catenary oxygen atoms,
   X² is —O—, —NR⁴— or —S—, where R⁴ is H or C₁-C₄ alkyl,
   z is 1 or 2,
   c) an oligomer of the formula X-[M¹]$_a$-[M²]$_b$-S—R³—X³H, wherein X is H, or the residue of an initiator,
   M¹ is the residue of a (meth)acrylate monomer having a pendent silyl group,
   M² is the residue of (meth)acrylate ester monomer,
   R³ is a divalent alkylene or arylene groups, or combinations thereof, said alkylene groups optionally containing one or more catenary oxygen atoms; and
   X³ is —O—, —S— or —NR⁴—, where R⁴ is H or C₁-C₄ alkyl;
   a is at least 2, b may be 0 and a+b is 2-20, and
   d) optionally an isocyanate-reactive compound.

2. The fluorochemical urethane of claim 1 comprising a isocyanate-reactive silane compound.

3. The fluorochemical urethane of claim 2 wherein said isocyanate-reactive silane is of the formula:

$$HX^6—R^6—\underset{\underset{Y_p}{|}}{Si}—(R^7)_{3-p},$$

wherein
X⁶ is —O—, —S— or —NR⁵—, where R⁵ is H, C₁-C₄ alkyl or —R⁶—Si(Y$_p$)(R⁷)$_{3-p}$;
R⁶ is a divalent alkylene group, said alkylene groups optionally containing one or more catenary oxygen atoms;
Y is a hydrolysable group,
R⁷ is a monovalent alkyl or aryl group,
p is 1, 2 or 3.

4. The fluorochemical urethane of claim 1 wherein $R_f^1$ is a monovalent perfluorooxyalkyl group, or a divalent a perfluorooxyalkylene group comprising one or more perfluorinated repeating units selected from the group consisting of —(C$_n$F$_{2n}$O)—, —(CF(Z)O)—, —(CF(Z)C$_n$F$_{2n}$O)—, —(C$_n$F$_{2n}$CF(Z)O)—, —(CF₂CF(Z)O)—, and combinations thereof, wherein n is 1 to 4 and Z is a perfluoroalkyl group, a perfluoroalkoxy group, or perfluorooxyalkyl group.

5. The fluorochemical urethane of claim 1 wherein said perfluorooxyalkylene group is selected from one or more of —[CF₂—CF₂—O]$_r$—; —[CF(CF₃)—CF₂—O]$_s$—; —[CF₂CF₂—O]$_r$—[CF₂O]$_t$—, —[CF₂CF₂CF₂CF₂—O]$_u$ and —[CF₂—CF₂—O]$_r$—[CF(CF₃)—CF₂—O]$_s$—; wherein each of r, s, t and u are each integers of 1 to 50.

6. The fluorochemical urethane of claim 1 wherein R$_f$ comprises a monovalent perfluorooxyalkylene group and z is 1.

7. The fluorochemical urethane of claim 1 wherein the molar ratio of silane groups to —NH—C(O)—X³-groups is greater than 1:1, wherein X³ is —O—, —S— or —NR⁴—, where R⁴ is H or C₁-C₄ alkyl.

8. The fluorochemical urethane of claim 1 wherein 5 to 50 mole percent of the isocyanate groups are reacted with said perfluoropolyether compound and 50 to 95 mole percent of the isocyanate groups are reacted with said oligomer.

9. A fluorochemical compound of the formula:

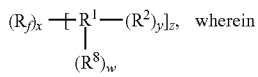  wherein $R_f$ is a monovalent perfluorooxyalkyl-containing group or a divalent perfluorooxyalkylene-containing group, $R^1$ is the residue of a polyisocyanate, $R^2$ is a silane-containing (meth)acrylate oligomer, $R^8$ is the residue of an isocyanate-reactive silane compound, w is 0, 1 or 2, x and y are each independently at least 1, and z is 1 or 2.

10. The compound of claim 9 wherein $R^2$ is of the formula:

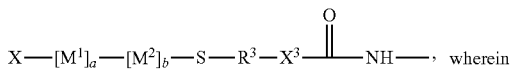, wherein

X is H, or the residue of an initiator, $M^1$ is the residue of a (meth)acrylate monomer having a pendent silyl group, $M^2$ is the residue of (meth)acrylate ester monomer, $R^3$ is a polyvalent alkylene or arylene groups, or combinations thereof, said alkylene groups optionally containing one or more catenary oxygen atoms;

a is at least 2, b may be 0 and a+b is 2-20, and $X^3$ is —O—, —S— or —NR$^4$—, where $R^4$ is H or $C_1$-$C_4$ alkyl.

11. The fluorochemical compound of claim 9 wherein $R^8$ is of the formula:

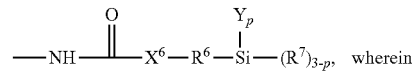 wherein $X^6$ is —O—, —S— or —NR$^5$—, where $R^5$ is H, $C_1$-$C_4$ alkyl or —R$^6$—Si(Y$_p$)(R$^7$)$_{3-p}$, $R^6$ is a divalent alkylene group, said alkylene groups optionally containing one or more catenary oxygen atoms;

Y is a hydrolysable group, $R^7$ is a monovalent alkyl or aryl group, and p is 1, 2 or 3.

12. The fluorochemical compound of claim 9 wherein $(R_f)_x$ is of the formula:

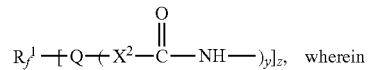 wherein $R_f^1$ is a monovalent perfluorooxyalkyl group or a divalent perfluorooxyalkylene group, Q is a covalent bond, or a polyvalent alkylene group of valency z, said alkylene optionally containing one or more catenary oxygen atoms, $X^2$ is –O—, —NR$^4$— or —S—, where $R^4$ is H or $C_1$-$C_4$ alkyl, z is 1 or 2.

13. A coating composition comprising at least one compound of claim 1 and a solvent.

14. The coating composition of claim 13 further comprising a silicone hardcoat.

15. The coating composition of claim 14 comprising 95 to 99.8% silicone hardcoat and 0.2 to 5% fluorochemical urethane, based on the total solids.

16. A substrate having a cured coating of a compound of claim 1 thereon.

* * * * *

UNITED STATES PATENT AND TRADEMARK OFFICE
CERTIFICATE OF CORRECTION

PATENT NO. : 7,897,678 B2
APPLICATION NO. : 11/828642
DATED : March 1, 2011
INVENTOR(S) : Zai-Ming Qiu It is certified that error appears in the above-identified patent and that said Letters Patent is hereby corrected as shown below:

Column 1,
Line 48, delete "X-[$M^1$]$_a$-[$M^2$]$_b$-S—R—$X^3$H,"
and insert -- X—[$M^1$]$_a$—[$M^2$]$_b$—S—$R^3$—$X^3$H, --.

Column 2,
Line 5, after "oligomer" insert -- . --.

Column 3,
Line 10, after "like" insert -- . --.

Column 5,
Line 19, delete "Desmodure™" and insert -- Desmodur™ --.

Column 7,
Line 5, delete "—[$CF_2CF_2CF_2CF_2$—)]$_u$"
and insert -- -[$CF_2CF_2CF_2CF_2$-O]$_u$ --.
Line 42, delete "$^{CH}_2$" and insert -- $CH_2$ --.

Column 8,
Line 30-31, delete "($CF_{12}(CF_2CF_2O)_{8-12}CF_2CH_2OH$"
and insert -- ($CF_2CF_2O)_{8-12}CF_2CH_2OH$ --.

Column 10,
Line 23, after "alkyl" insert -- . --.
Line 40, delete "X-[$M^1$]$_a$-[$M^2$]$_b$-S—R—$X^3$H"
and insert -- X—[$M^1$]$_a$—[$M^2$]$_b$—S—$R^3$—$X^3$H --.

Column 11,
Line 19, delete "phtalate," and insert -- phthalate, --.

Signed and Sealed this
Twenty-sixth Day of July, 2011

David J. Kappos
*Director of the United States Patent and Trademark Office*

CERTIFICATE OF CORRECTION (continued)
U.S. Pat. No. 7,897,678 B2

Line 56, after "aminopropyltripropoxysilane" delete "," and insert -- . --.

Column 12,
Line 20, delete "X is" and insert -- $X^6$ is --.
Line 35, after "disclosure" insert -- . --.

Column 13,
Line 45, after "thereof" insert -- . --.

Column 14,
Line 44, delete "hydrosylates" and insert -- hydrolysates --.
Line 45, delete "hydrosylates" and insert -- hydrolysates --.

Column 15,
Line 15, delete "hydrosylates" and insert -- hydrolysates --.

Column 18,
Line 13, delete "Isophonone" and insert -- Isophorone --.
Line 59, delete "(237 mL)" and insert -- (~237 mL) --.

Column 20,
Line 14, delete "18%" and insert -- ~18% --.

Column 26,
Line 62-63, delete "$R_f$comprises" and insert -- $R_f^1$ comprises --.